United States Patent
Jurkovic

(10) Patent No.: US 9,814,116 B2
(45) Date of Patent: Nov. 7, 2017

(54) LED LAMP WITH INTEGRAL CONTROL RECEPTACLE

(71) Applicant: Eye Lighting International of North America, Inc., Mentor, OH (US)

(72) Inventor: Paul J. Jurkovic, Painesville, OH (US)

(73) Assignee: Eye Lighting International of North America, Inc., Mentor, OH (US)

( * ) Notice: Subject to any disclaimer, the term of this patent is extended or adjusted under 35 U.S.C. 154(b) by 0 days.

(21) Appl. No.: 15/286,559

(22) Filed: Oct. 5, 2016

(65) Prior Publication Data

US 2017/0099717 A1    Apr. 6, 2017

Related U.S. Application Data

(60) Provisional application No. 62/237,530, filed on Oct. 5, 2015.

(51) Int. Cl.
| | |
|---|---|
| *F21V 21/00* | (2006.01) |
| *H05B 37/02* | (2006.01) |
| *F21V 29/74* | (2015.01) |
| *F21V 3/02* | (2006.01) |
| *F21V 29/89* | (2015.01) |
| *F21S 8/08* | (2006.01) |
| *H05B 33/08* | (2006.01) |
| *F21V 21/002* | (2006.01) |
| *F21S 4/28* | (2016.01) |

(52) U.S. Cl.
CPC .......... *H05B 37/0227* (2013.01); *F21S 8/088* (2013.01); *F21V 3/02* (2013.01); *F21V 29/74* (2015.01); *F21V 29/89* (2015.01); *H05B 33/0845* (2013.01); *H05B 33/0854* (2013.01); *H05B 33/0857* (2013.01); *H05B 37/0218* (2013.01); *H05B 37/0272* (2013.01); *F21S 4/28* (2016.01); *F21V 21/002* (2013.01)

(58) Field of Classification Search
CPC .......... F21V 21/00; F21V 21/002; F21S 4/28; H05B 33/0854; H05B 37/0218
USPC ............. 250/200; 315/149, 150; 362/217.01, 362/217.14, 217.15, 217.17
See application file for complete search history.

(56) References Cited

U.S. PATENT DOCUMENTS

| | | | | |
|---|---|---|---|---|
| 3,189,736 | A | * | 6/1965 | Waldbauer .............. F21S 8/088 362/308 |
| 7,547,876 | B2 | * | 6/2009 | Flaherty .............. F21V 23/0442 250/214 AL |
| D743,914 | S | * | 11/2015 | Hobson ........................ D13/165 |

(Continued)

*Primary Examiner* — Thuy Vinh Tran
(74) *Attorney, Agent, or Firm* — Dwight Stauffer, Reg. Patent Agent

(57) ABSTRACT

An LED lamp is enhanced by adding an integral control receptacle, wherein a frame structure of the lamp having a horizontal top surface is adapted by attaching a photocontrol receptacle on the top surface and wiring it for powering some pins of the receptacle and for connecting some pins for controlling functions of the LED lamp. The control is provided by plugging a suitable controller into the receptacle. Advantageously, a metal plate is attached between the receptacle and the lamp frame, thereby enhancing performance in ways that include heat sinking, blocking uplight, reflecting added light down and outward. Additional lighting effects are derived from optionally shaping the plate, providing different surfaces on it, and/or attaching more LEDs on it.

13 Claims, 4 Drawing Sheets

(56) References Cited

U.S. PATENT DOCUMENTS

2011/0156584 A1* 6/2011 Kim .................... F21K 9/00
   315/32

* cited by examiner

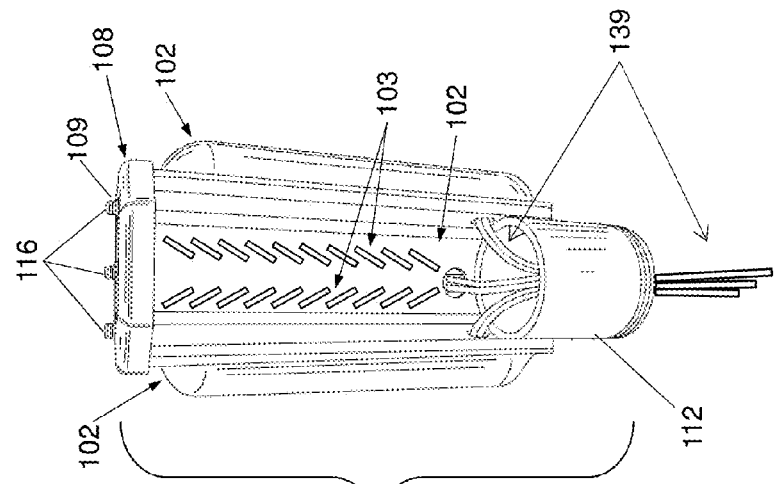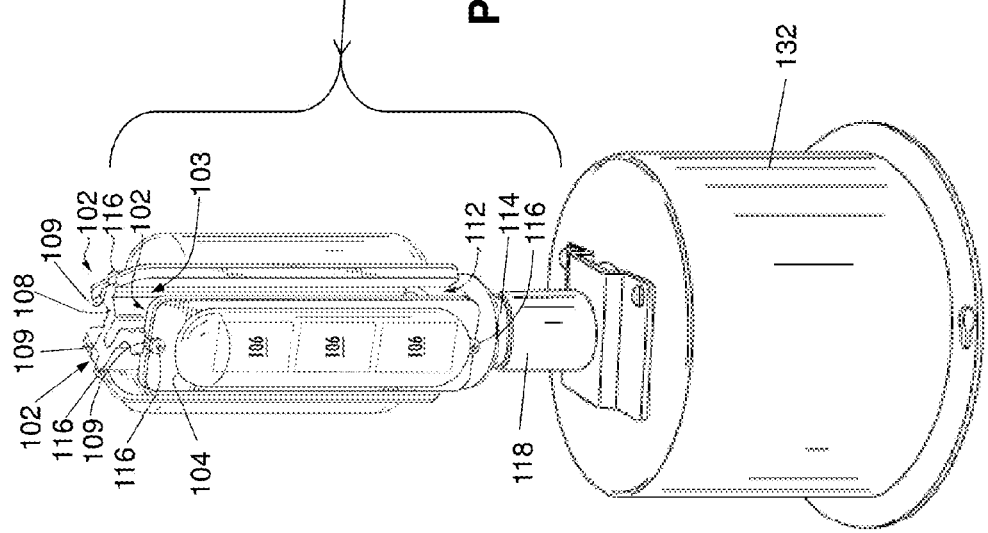

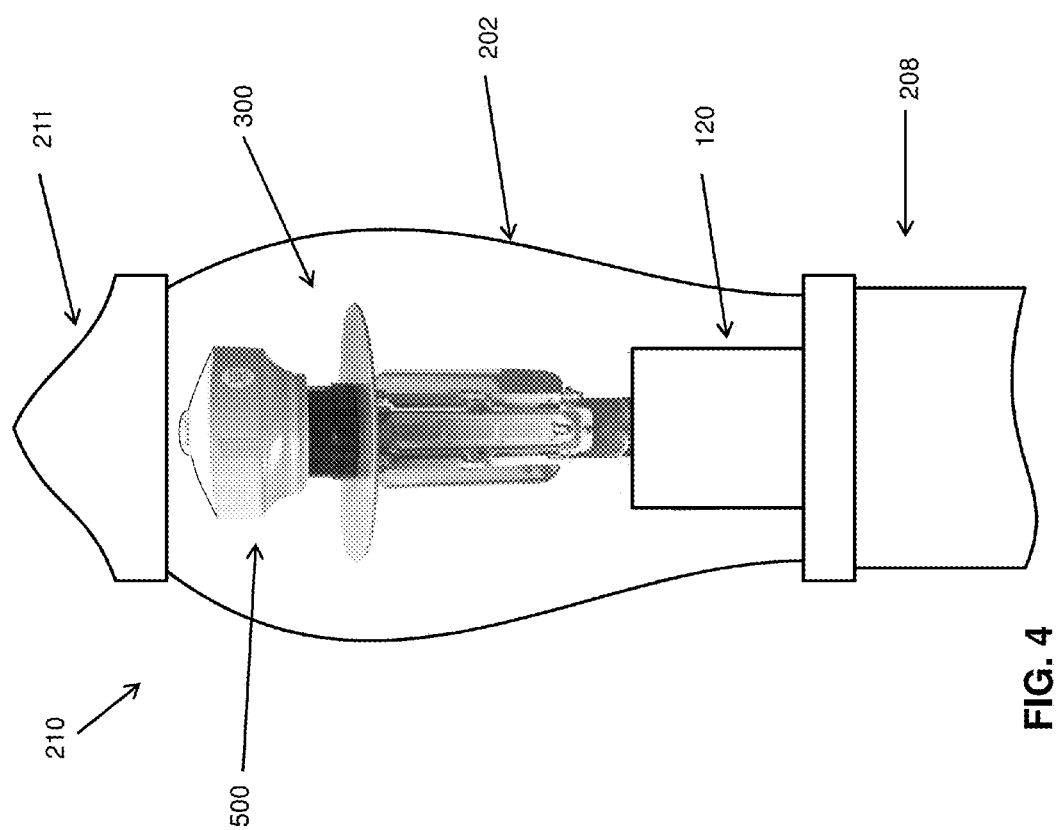

LED LAMP WITH INTEGRAL CONTROL RECEPTACLE

CROSS-REFERENCE TO RELATED APPLICATIONS

This application claims the benefit of U.S. Provisional Patent Application No. 62/237,530, filed Oct. 5, 2015, said application hereby incorporated in its entirety by reference herein.

BACKGROUND OF THE INVENTION

It is known to add advanced forms of photocontrols to streetlights including wireless controls and/or programmable "smart controls" by plugging the advanced controller into a photocontrol receptacle that is commonly provided on the top of streetlight fixtures. It is desirable to extend this type of control to other lighting fixtures, but post top fixtures don't have any place to put the controller or receptacle.

BRIEF SUMMARY OF THE INVENTION

According to the invention an LED lamp with a frame structure having a horizontal top surface is improved by attaching a photocontrol receptacle on the top surface and wiring it for powering some pins of the receptacle and for connecting some pins for controlling functions of the LED lamp. The control may be provided by plugging a suitable controller into the receptacle. Advantageously, a metal plate may be attached between the receptacle and the lamp frame, thereby enhancing performance in ways that include heat sinking, blocking uplight, reflecting added light down and outward. Additional lighting effects may be derived from optionally shaping the plate, providing different surfaces on it, and/or attaching more LEDs on it.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Elements of the figures can be numbered such that similar (including identical) elements may be referred to with similar numbers in a single drawing. For example, each of a plurality of elements collectively referred to as 199 may be referred to individually as 199a, 199b, 199c, etc. Or, related but modified elements may have the same number but are distinguished by primes. For example, 109, 109', and 109" are three different versions of an element 109 which are similar or related in some way but are separately referenced for the purpose of describing modifications to the parent element (109). Such relationships, if any, between similar elements in the same or different figures will become apparent throughout the specification, including, if applicable, in the claims and abstract.

The structure, operation, and advantages of the present preferred embodiment of the invention will become further apparent upon consideration of the following description taken in conjunction with the accompanying drawings, wherein:

FIGS. 1A and 1B illustrate two existing LEDioc lamp configurations/mounting kits suitable for installation in a post top fixture.

Figure 2A:
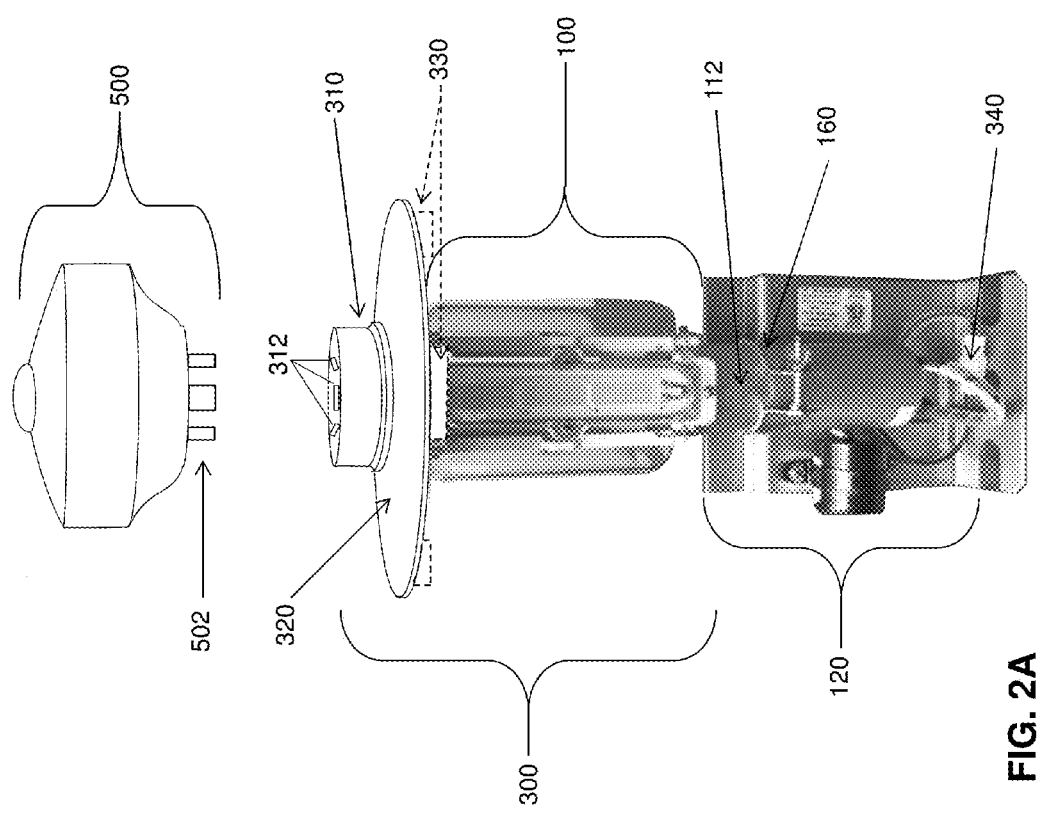
Figure 3:
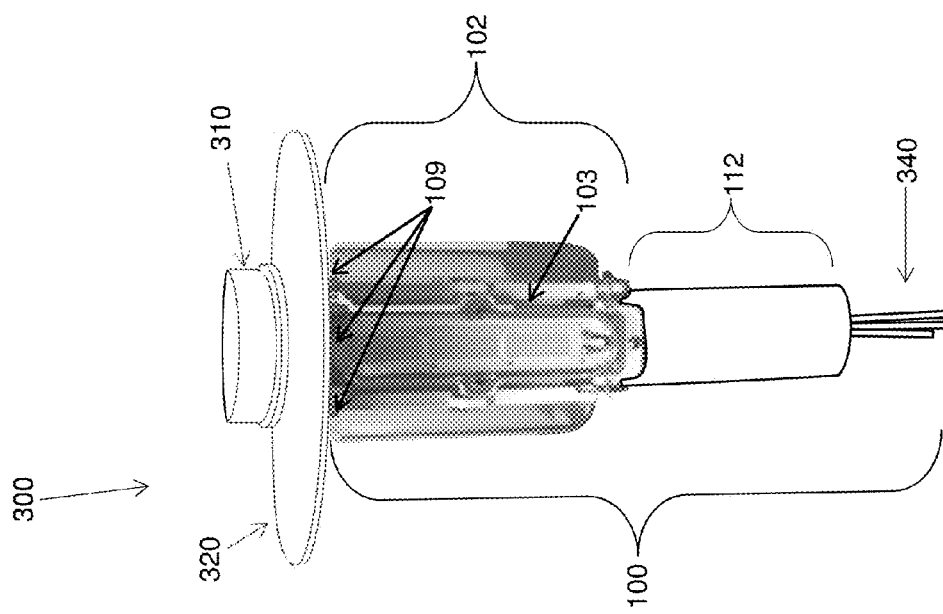
Figure 2B:
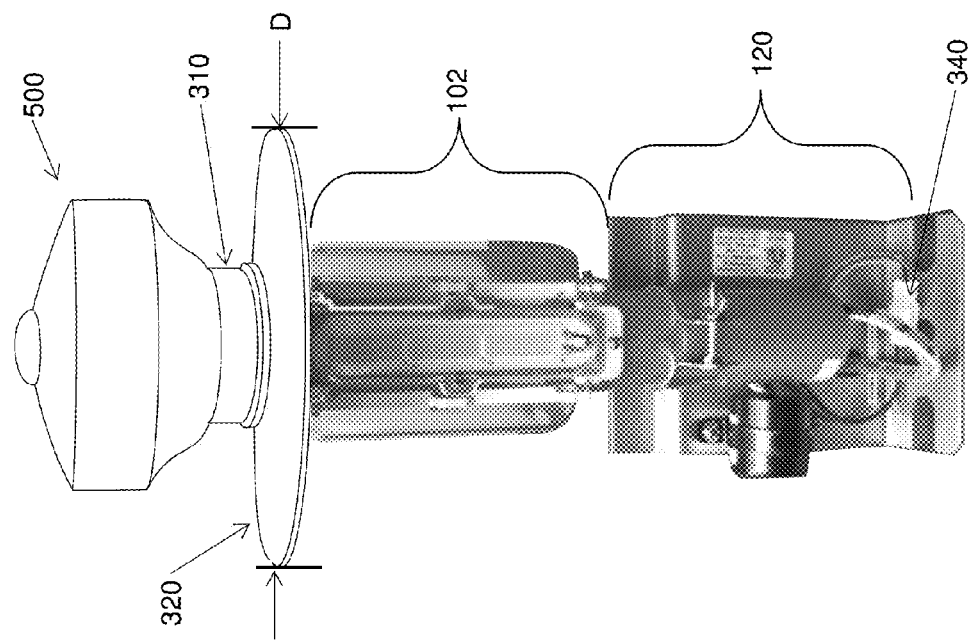

FIGS. 2A-3) are perspective views that illustrate aspects of the lamp improved according to the invention.

FIG. 4 is a schematic representation of the new lamp with controller as it would look installed in a post top fixture.

DETAILED DESCRIPTION OF THE INVENTION

The following table is a glossary of terms and definitions, particularly listing drawing reference numbers or symbols and associated names of elements, features and aspects of the invention(s) disclosed herein.

| REF. | TERMS AND DEFINITIONS |
| --- | --- |
| 100 | lamp, light source, new lamp, axially extended light source/lamp using light panels which may be mounted for directional lighting (light distribution non-uniform around 360 degree circle. Variations may be labeled 100a, 110b, etc |
| 102 | LED bar, light bar, panel, module |
| 103 | heat sinking surfaces and/or fins on back of LED bars |
| 104 | cover (of LEDs or other light emitter)-diffuse translucent, transparent |
| 106 | LED array, large area light emitter |
| 108 | LED bar mounting frame at top |
| 109 | screw attachment locations |
| 112 | collar (tubular, extends up out of base, if present), forms lower part of mounting frame |
| 114 | threaded lamp base (e.g., mogul, medium) |
| 116 | fastener (e.g., machine screw, screw with hex nut) |
| 118 | lamp socket modified to enable rotational adjustment |
| 120 | retrofit assembly that adapts old luminaire 210 for use with new lamp 100 |
| 132 | modified canister-supports and positions new lamp in socket, and may contain ballast, driver, and/or other lamp control apparatus' |
| 134 | mounting flange of 132 |
| 136 | circumferential slots in flange 134 |
| 138 | lamp control apparatus' (e.g., ballast, driver, surge protector, etc.) |
| 139 | light source lead wires |
| 160 | split clamp |
| 202 | globe part of luminaire 210 |
| 208 | post cap-bottom of luminaire, used to attach it to a lamp post |
| 210 | "post top" type of luminaire used to uniformly illuminate a 360 degree circular area such as street light at curb. |
| 211 | fixture cap |
| 300 | new lamp with integral control receptacle |
| 310 | photocontrol receptacle |
| 312 | pin sockets in 310, for mating with controller pins 502 |
| 320 | plate, disk, preferably metal, preferably reflective on bottom |
| 330 | optional added features on plate |
| 340 | wiring for lamp and for controller (receptacle) |
| 500 | controller (user supplied) |
| 502 | electrical connection pins (3 of 7 shown) |
| D | diameter of disc 320, preferably 4 to 7", most preferably 4 to 5" |

The invention(s) will now be described with reference to the drawings and the reference numbers and symbols listed in the above table.

The present invention may be an improved version of the "LEDioc Lamp" as previously disclosed (see pending patent U.S. application Ser. No. 14/606,015 filed Jan. 26, 2015).

An important feature is integrating a receptacle with the LEDioc Lamp, wherein the receptacle is suitable for plugging in a photocontroller, a programmable controller, and preferably a controller with integral wireless communication. A NEMA C136.41 receptacle is particularly suitable, as it has 7 contacts (pins) wired in. This receptacle is currently being used as an upgraded socket/receptacle for the photocontrol typically mounted on top of a cobra head outdoor lighting fixture, for example, however it is not used on post top fixtures (such as the ones which can use the LEDioc lamp) because there is no unobtrusive spot for mounting it (e.g., see FIG. 4). Mating controllers are available to replace a simple photocontrol in the receptacle, in particular an "Intelligent Wireless Outdoor Lighting Control" that is commercially available from CIMCON Co. (www.cimcon-lighting.com). A preferred model is the CIMCON iSLC-3100-7P that includes a programmable controller with wireless communication gear and much more.

This controller receptacle will be offered as an accessory (i.e., an optional feature that can be built into any of the LEDioc lamp versions, and/or luminaire upgrade configurations/kits associated with the LEDioc lamps. Of course it is not limited to this particular lamp model. The invention obviously applies to any LED lamp with a support frame ending in a top surface suitable for attaching at least the control receptacle, and preferably also the metal plate, e.g., an aluminum plate 320.

FIGS. 1A and 1B illustrate two existing LEDioc lamp configurations/mounting kits suitable for installation in a post top fixture. Note that the top part of the lamp frame is physically and thermally attached to the top of the LED bar modular components, thereby making it part of the LED heat sink that also includes the vertical metal back of each bar. The axial center of the lamp is open to allow for cooling air circulation, and is also used to enable wiring connections from each bar down into or through the lamp base. FIG. 1B shows a preferred embodiment where the base is a hollow tube with the wires freely passing through.

The remaining FIGS. 2A-4) illustrate aspects of the new lamp of the present disclosure.

Although the receptacle could be directly attached to the top frame piece, a preferred embodiment adds a metal disc (flat plate, preferably round) in between. The disk may be mounted on the top frame piece, but preferably is directly attached to the bar tops in place of the top frame piece, thereby providing the best thermal connection. The disk is a high thermal conductivity material, e.g., aluminum, and extends radially outward so that it can serve as a heat sink cooling fin. The disk may be circular or may be perforated and/or shaped into other forms suitable for heat sink cooling.

As an extra benefit, the disk partially blocks "uplight" emitted from the light bars, and can be used as a shield to control the amount of uplight. Furthermore, the blocked light is reflected downward and outward by the disk, thereby adding to the useful lighting in the area around the fixture.

The disk diameter D of the prototype was about 7" with a stated expectation of reducing it to between 7 inches in diameter (as shown) and about 4 inches, with the final diameter being determined by optimizing/fine tuning the heat dissipation and uplight shielding effects. Our development has determined that an optimum diameter is in the range of 4 to 5 inches, most preferably around 4.5". The final version has a glossy white "powder coat" finish which is suitably reflective.

FIG. 3 illustrates a preferred embodiment of the presently disclosed LED Lamp With Integral Control Receptacle, which includes an aluminum disc that functions as a combined mounting structure for 7 pin receptacle, heat sink and light reflector/shield.

FIG. 2A shows the new lamp as it is mounted in a fixture with attendant electronics for driving the LED lighting. An example of a user-installable controller is shown above it, and shown plugged into the receptacle in FIG. 2B. Wired connections between the receptacle, the LED bars, and the electronics are easily made by passing wires through holes in the disk and down through the open center of the lamp and base.

FIG. 4 is a schematic representation of the new lamp with controller as it would look installed in a post top fixture, wherein the mounting base structure and electronics are enclosed in a suitable canister. This shows that the new lamp with controller can fit within existing post top fixtures and has sufficient clearance below the (typically metal) fixture cap to allow adequate wireless communication between the controller and an external network or remote controller.

In example embodiments, the CIMCON (or other intelligent controller) may be programmed (or externally controlled) to turn the lamp ON when it gets dark but not turn OFF when it detects the light it controls. Or, ON at dusk, OFF at a scheduled time-of-day.

In another embodiment (illustrated in FIG. 2A), the disc also acts as a heat sink and mounting structure for downward-facing extra lighting features such as "Turtle Safe" orange LEDs that would be controlled by unused pins of receptacle (e.g., pins 6 and 7). A corresponding addition to the controller program controls dimming and color change from people friendly to turtle friendly. A Turtle LED driver would be added to the control electronics (e.g., on top of heat sink disk, in LEDioc lamp base/tube, added to fixture electronics, or added to a customized version of the controller).

Although the invention has been illustrated and described in detail in the drawings and foregoing description, the same is to be considered as illustrative and not restrictive in character —it being understood that the embodiments shown and described have been selected as representative examples including presently preferred embodiments plus others indicative of the nature of changes and modifications that come within the spirit of the invention(s) being disclosed and within the scope of invention(s) as claimed in this and any other applications that incorporate relevant portions of the present disclosure for support of those claims. Undoubtedly, other "variations" based on the teachings set forth herein will occur to one having ordinary skill in the art to which the present invention most nearly pertains, and such variations are intended to be within the scope of the present disclosure and of any claims to invention supported by said disclosure.

What is claimed is:

1. An enhanced LED lamp comprising:
   a frame structure supporting vertically arrayed LEDs and having a horizontal top surface, distal to a base end;
   an integral receptacle for a lamp controller attached on the top surface, and a disc mounted on the top surface and extending radially outward; wherein the lamp controller has pins for electrical connections to pin sockets in the integral receptacle; and
   wherein the integral receptacle and the lamp controller being adapted for base down installation and in an enclosed post top lighting fixture.

2. The enhanced LED lamp of claim 1, wherein:
   the lamp controller is a programmable controller.

3. The enhanced LED lamp of claim 2, wherein:
the programmable controller utilizes wireless communications.
4. The enhanced LED lamp of claim 2, wherein:
the programmable controller of a iSLC-3100 -7 P model CIMCON.
5. The enhanced LED lamp of claim 1, wherein:
the receptacle is a NEMA C136.41 receptacle.
6. The enhanced LED lamp of claim 1, wherein:
the disc extends outward of the vertically arrayed LEDs.
7. The enhanced LED lamp of claim 1, wherein:
the disc is round and has a diameter of approximately 4 to 7 inches.
8. The enhanced LED lamp of claim 1, wherein:
the disc has a reflective surface.
9. The enhanced LED lamp of claim 1, wherein:
the disc is opaque to block uplight.
10. The enhanced LED lamp of claim 1, wherein:
the disc is thermally conductive.
11. The enhanced LED lamp of claim 1, wherein:
the disc is plastic.
12. An enhanced LED lamp comprising:
a frame structure supporting vertically arrayed LEDs and having a horizontal top surface, distal to a base end;
an integral receptacle foe a lamp controller attached on the top surface; and a disc mounted on the top surface and extending radially outward; wherein the lamp controller has pins for electrical connections to pin sockets in the integral receptacle; and
wherein the integral receptacle and the lamp controller being adapted for vertical burning in a globe enclosed lighting fixture.
13. The enhanced LED lamp of claim 12, further comprising:
a disc mounted on the top surface and extending radially outward.

* * * * *